(12) United States Patent
Koenig et al.

(10) Patent No.: US 12,368,343 B2
(45) Date of Patent: Jul. 22, 2025

(54) TURBOGENERATOR BRAKES

(71) Applicant: Hamilton Sundstrand Corporation, Charlotte, NC (US)

(72) Inventors: Andreas C. Koenig, Rockford, IL (US); Aaron Cooling, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 298 days.

(21) Appl. No.: 18/103,026

(22) Filed: Jan. 30, 2023

(65) Prior Publication Data

US 2024/0258875 A1   Aug. 1, 2024

(51) Int. Cl.
| | |
|---|---|
| *H02K 7/10* | (2006.01) |
| *H02K 7/102* | (2006.01) |
| *H02K 7/18* | (2006.01) |
| *H02P 9/06* | (2006.01) |
| *H02K 7/00* | (2006.01) |

(52) U.S. Cl.
CPC ............ *H02K 7/102* (2013.01); *H02K 7/1823* (2013.01); *H02P 9/06* (2013.01); *H02K 7/003* (2013.01)

(58) Field of Classification Search
CPC ........ F01D 15/10; F01D 21/006; F01D 21/02; F05D 2220/76; F05D 2240/51; F16D 9/08; H02K 11/21; H02K 7/003; H02K 7/102; H02K 7/1823; H02P 9/06
See application file for complete search history.

(56) References Cited

U.S. PATENT DOCUMENTS

| | | | |
|---|---|---|---|
| 4,841,202 A * | 6/1989 | Dishner | H02P 9/06 322/40 |
| 7,849,668 B2 | 12/2010 | Sheridan | |
| 2005/0262961 A1* | 12/2005 | Howard | F16D 9/02 74/567 |
| 2006/0152015 A1* | 7/2006 | Bywaters | H02K 7/1838 290/55 |
| 2017/0126159 A1 | 5/2017 | Spierling et al. | |
| 2018/0200896 A1* | 7/2018 | Boyland | H02K 7/102 |
| 2018/0226908 A1* | 8/2018 | Masolov | H02P 9/08 |
| 2019/0016325 A1* | 1/2019 | Yasui | B60T 8/171 |
| 2019/0211749 A1* | 7/2019 | Rodrigues | F16D 1/116 |
| 2022/0242585 A1 | 8/2022 | Hon et al. | |

FOREIGN PATENT DOCUMENTS

| | | | | |
|---|---|---|---|---|
| CN | 1166872 C | * | 9/2004 | ............ F16D 55/02 |
| CN | 111446808 A | * | 7/2020 | |

OTHER PUBLICATIONS

CN-1166872-C, Schmidt, all pages, 2004 (Year: 2004).*
CN-111446808-A, Jiang, all pages, 2020 (Year: 2020).*
European Search Report dated Jul. 1, 2024 in connection with European Patent Application No. 24154477.4, 34 pages.

* cited by examiner

*Primary Examiner* — Naishadh N Desai

(57) ABSTRACT

A system includes a permanent magnet generator (PMG) with a generator shaft. An input spline is included on the generator shaft on a first side of the PMG with respect to a longitudinal axis of the generator shaft. A brake is operatively connected to the generator shaft axially between the input spline and an end of the generator shaft on a second side of the PMG opposite the first side with respect to the longitudinal axis.

20 Claims, 3 Drawing Sheets

TURBOGENERATOR BRAKES

BACKGROUND

1. Field

The present disclosure relates to power generation, and more particularly to brakes for permanent magnet generators (PMGs) such as used with gas turbine engines to generate electrical power.

2. Description of Related Art

For hybrid-electric aircraft and for more-electric aircraft applications it can be advantageous to have a fuel driven heat engine driving an electrical generator where the electrical generator constitutes most of the mechanical load on the engine. If the electrical load on the generator is suddenly significantly reduced by an event such as a shutdown of the electrical consumers on the electrical bus, a contactor disconnect, or a short circuit fault in the electrical system or generator, the mechanical load on the engine will be suddenly reduced. The reduction of load on the engine can lead to an uncontrolled acceleration and overspeed of the engine and attached generator. Systems must be designed to avoid the fact that if the engine is allowed to accelerate in an uncontrolled manner it can lead to overspeed sufficient to cause failure of the engine and/or electrical generator.

Additionally for permanent magnet generators (PMGs), the output voltage is proportional to the speed of rotation of the generator shaft. Designs should account for the fact that in the case of a runaway overspeed condition, this voltage could increase beyond the voltage capability of the downstream electrical loads damaging or destroying them as well.

The conventional techniques have been considered satisfactory for their intended purpose. However, there is an ever present need for improved systems and methods for braking or overspeed limiting PMGs such as in aerospace applications. This disclosure provides a solution for this need.

SUMMARY

A system includes a permanent magnet generator (PMG) with a generator shaft. An input spline is included on the generator shaft on a first side of the PMG with respect to a longitudinal axis of the generator shaft. A shear section of the generator shaft can be axially between the input spline and the PMG along the longitudinal axis. A brake is operatively connected to the generator shaft axially between the input spline and an end of the generator shaft on a second side of the PMG opposite the first side with respect to the longitudinal axis.

A gas turbine engine (GTE) can be operatively connected to the input spline to drive the PMG. A servo can be operatively connected to actuate the brake for braking rotation of the PMG. The servo can be a hydraulic servo connected to an oil system that provides oil to the PMG and/or to the GTE.

The brake can be operatively connected to a portion of the generator shaft between the end of the generator shaft on the second side of the PMG and the PMG itself, with respect to the longitudinal axis. The brake can include a disc mounted to the generator shaft and a caliper operatively connected to the disc to selectively press the disc between pads of the caliper upon servo actuation of a piston of the caliper. The brake can be a drum type brake with pads operatively connected for servo actuation to press a drum to brake rotation of the generator shaft. The brake can be a band-type brake with a band operatively connected for servo actuation to apply band friction to the generator shaft for braking.

A generator control unit (GCU) can be operatively connected to the PMG for controlling electrical output of the PMG. The GCU can be operatively connected to a servo, which can be operatively connected to actuate the brake based on commands from the GCU. A sensor can be operatively connected to the GCU to provide feedback for controlling the brake. The sensor can include a speed sensor operatively connected to provide feedback to the GCU indicative of speed of the generator shaft. The sensor can include a voltage sensor operatively connected to a voltage output of the PMG to generate feedback to the GCU indicative of voltage output of the PMG. The GCU can be configured to output servo current to the servo for control of braking of the generator shaft.

The GCU can include machine readable instructions configured to cause the GCU to receive input indicative of an overspeed condition for a PMG, and enter into a braking mode based on the input indicative of the overspeed condition; and output a command to a servo for dynamic control of a brake for dynamically applying braking to the generator shaft. The machine readable instructions can be configured to cause the GCU to: receive input indicative of controlled reduction below the overspeed condition for the PMG, and terminate the braking mode based on the input indicative of the overspeed condition; and output a command to the servo to end application of braking to the generator shaft. A mechanical governor can be operatively connected to actuate the brake based on speed of the generator shaft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
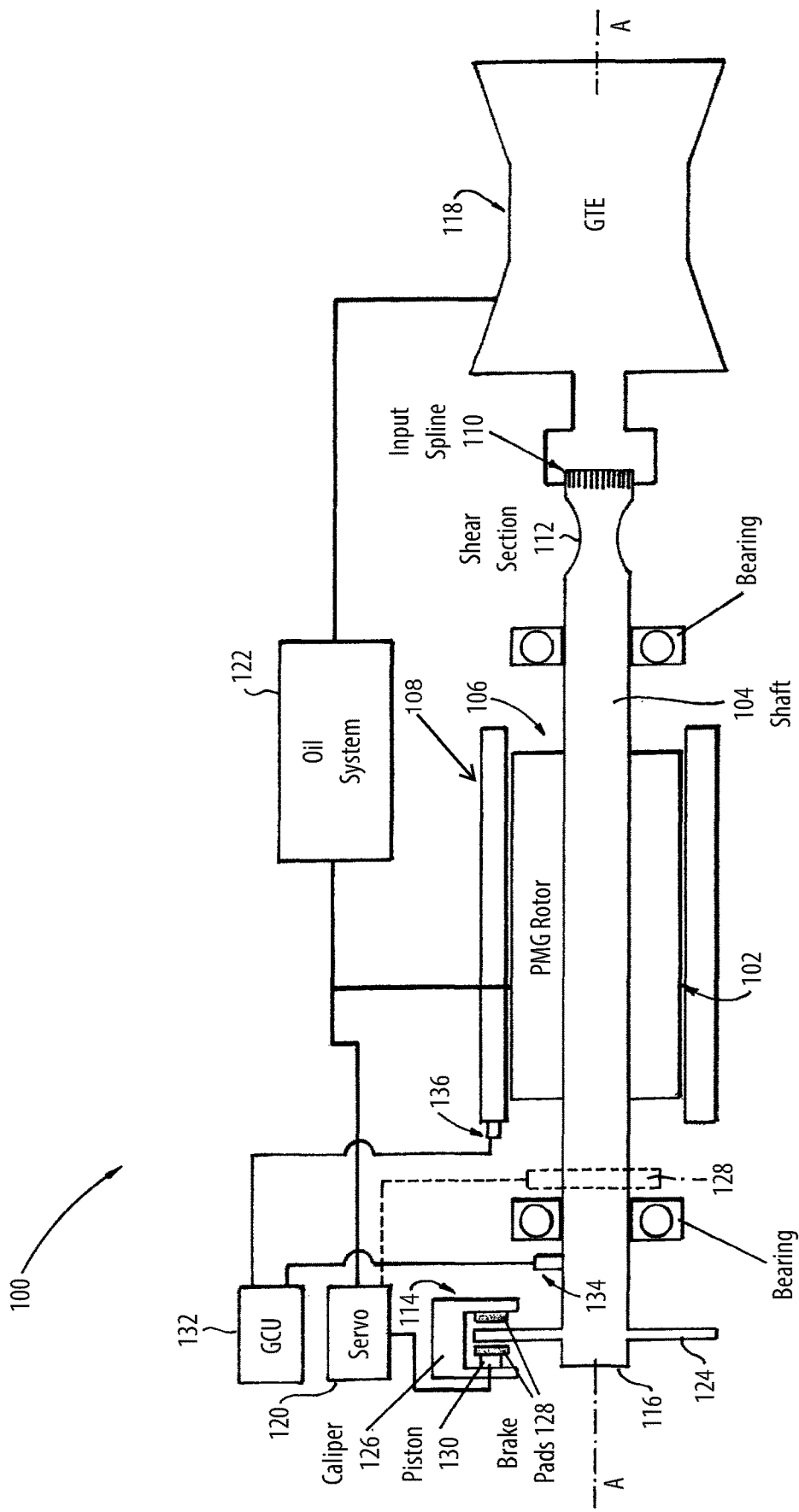
FIG. 1 is a schematic view of an embodiment of a system constructed in accordance with the present disclosure, showing a disc brake on the generator shaft.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide active dynamic braking for overspeed protection in permanent magnet generators (PMGs) such as those connected to gas turbine engines (GTEs) for generating power onboard aircraft.

The system 100 includes a permanent magnet generator (PMG) 102 with a generator shaft 104 that rotates together with a PMG rotor 106 relative to a stationary stator PMG stator 108. An input spline 110 is included on the generator shaft 104 on a first side of the PMG 102 with respect to a longitudinal axis A of the generator shaft 104. A shear section 112 of the generator shaft 104 is axially between the input spline 110 and the PMG 102 along the longitudinal axis A. The shear section 112 can be any suitable type of clutch, necking down in diameter, or other type of frangible or rupturable connection allowing for disconnection of the PMG 102 from its prime mover if needed. A brake 114 is operatively connected to the generator shaft axially between the shear section 112 and an end 116 of the generator shaft 104 on a second side of the PMG 102 opposite the first side, i.e. on the opposite side for the PMG 102 from the spline 110, with respect to the longitudinal axis A.

A gas turbine engine (GTE) 118 is operatively connected to the input spline 110 to drive the generator shaft 104 and rotor 106 of the PMG 102. The GTE 118 can be part of an auxiliary power unit (APU) of an aircraft, or part of a hybrid-electric power train, e.g. where the generator is used to power a system of batteries and/or electrical propulsion motors. A servo 120 is operatively connected to actuate the brake 114 for braking rotation of the PMG 102. The servo 120 is a hydraulic servo connected to an oil system 122 that provides oil at sufficient pressure for servo actuation, e.g. wherein the oil system is configured for cooling and/or lubricating the PMG 102 and/or the GTE 118, to the PMG 102 and/or to the GTE 118 through the lines indicated in FIG. 1.

With continued reference to FIG. 1, the brake 114 is operatively connected to a portion of the generator shaft 104 between the end 116 of the generator shaft on the second side of the PMG 102 and the PMG 102 itself, with respect to the longitudinal axis A. The brake 114 includes a disc 124 mounted to the generator shaft 104 and a caliper 126 operatively connected to the disc 124 to selectively press the disc between pads 128 of the caliper 126 upon the servo 120 actuating a piston 130 of the caliper 114. The caliper 126 is attached to the housing, e.g. housing the stator 108, or other structure so the caliper 126 is stationary relative to the disc 124.

A generator control unit (GCU) 132 is operatively connected to the PMG 102 for controlling electrical output of the PMG 102. The GCU 132 is operatively connected to control the servo 120, which is operatively connected to actuate the brake 114 based on commands from the GCU 132. A sensor 134 is operatively connected to the GCU 132 to provide feedback for controlling the brake 114. The sensor 134 includes a speed sensor operatively connected to provide feedback to the GCU 132 indicative of speed of the generator shaft 104. In addition to or in lieu of a speed sensor 132, the sensor can be a voltage sensor 136 operatively connected to a voltage output of the PMG 102, e.g. from the stator 108, to generate feedback to the GCU 132 indicative of voltage output of the PMG 102. The GCU 132 is configured to output servo current to the servo 120 for control of braking of the generator shaft 104.

The GCU 132 includes machine readable instructions, e.g. digital code, solid state logic, analog circuitry, or the like, configured to cause the GCU to receive input indicative of an overspeed condition for a PMG, e.g. speed and/or voltage input such as from sensors 134, 136, and enter into a braking mode based on the input indicative of the overspeed condition. The machine readable instructions are also configured to cause the GCU to output a command, i.e. as servo voltage, to the servo 120 for dynamic control of the brake 114 for dynamically applying braking to the generator shaft 104. After the cause of an overspeed condition is abated, the machine readable instructions are configured to cause the GCU 132 to: receive input indicative of controlled reduction below the overspeed condition for the PMG, e.g. speed and/or voltage input from the sensors 134, 136, terminate the braking mode based on the input indicative of the overspeed condition, and output a command to the servo 120 to end application of braking to the generator shaft 104. Normal operation of the PMG 102 can then resume. Instead of the GCU or other controller, a mechanical governor, e.g. flyball, can be operatively connected to actuate the brake 114 based on speed of the generator shaft 104, as indicated by the mechanical governor 138 shown in broken lines in FIG. 1.

Figure 2:
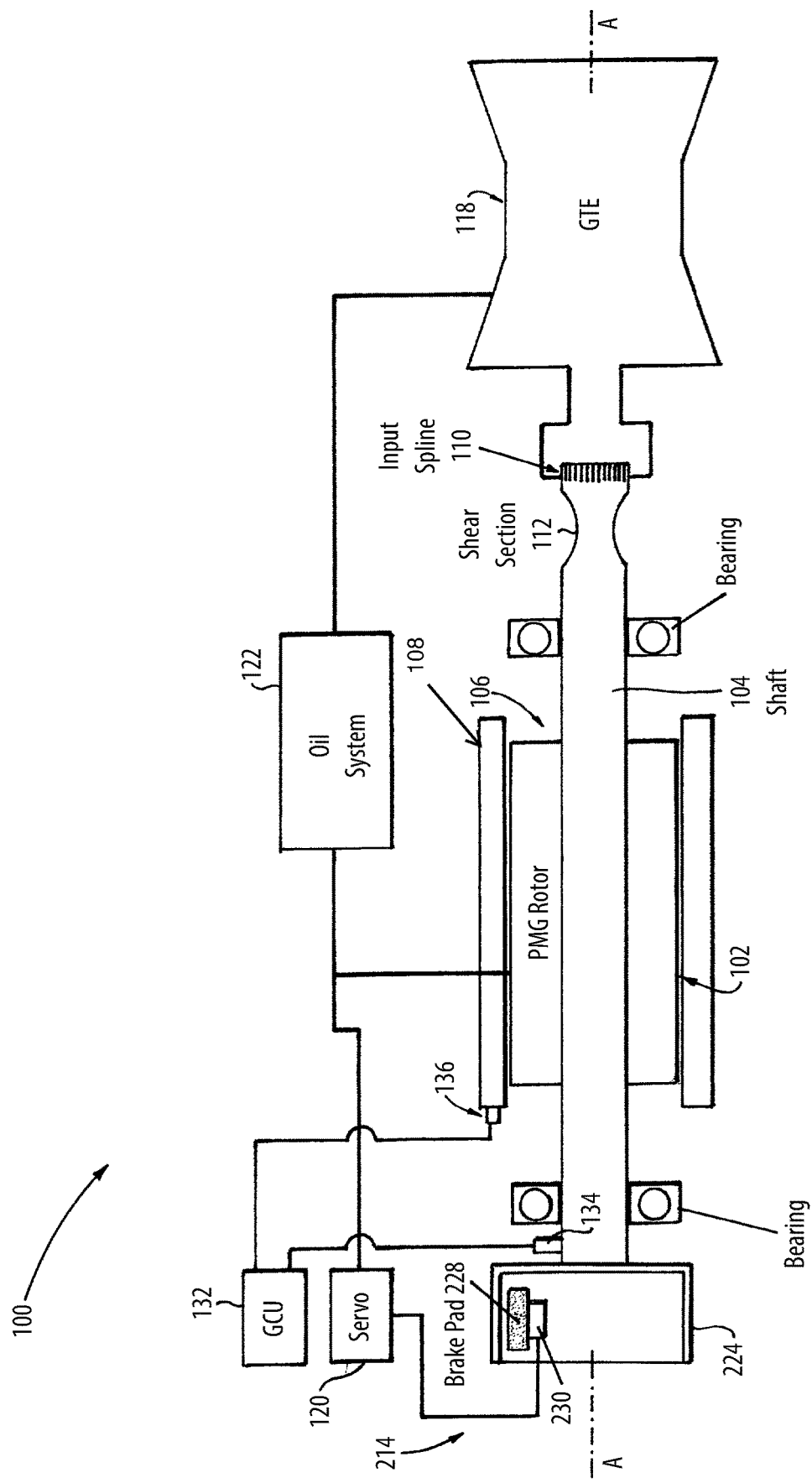
FIG. 2 is a schematic view of an embodiment of a system constructed in accordance with the present disclosure, showing a drum brake on the generator shaft.

With reference now to FIG. 2, the system 100 is shown much as described above, but with a brake 214 that is a drum brake instead of the disc brake described above. The drum 224 is connected to the generator shaft 104. A pad 228 is operatively connected to selectively press against the drum 224 upon the servo 120 actuating the piston 230. Only one pad 228 and piston 230 are shown, but those skilled in the art will readily appreciate that any suitable number of pistons and pads can be used without departing from the scope of this disclosure.

Figure 3:
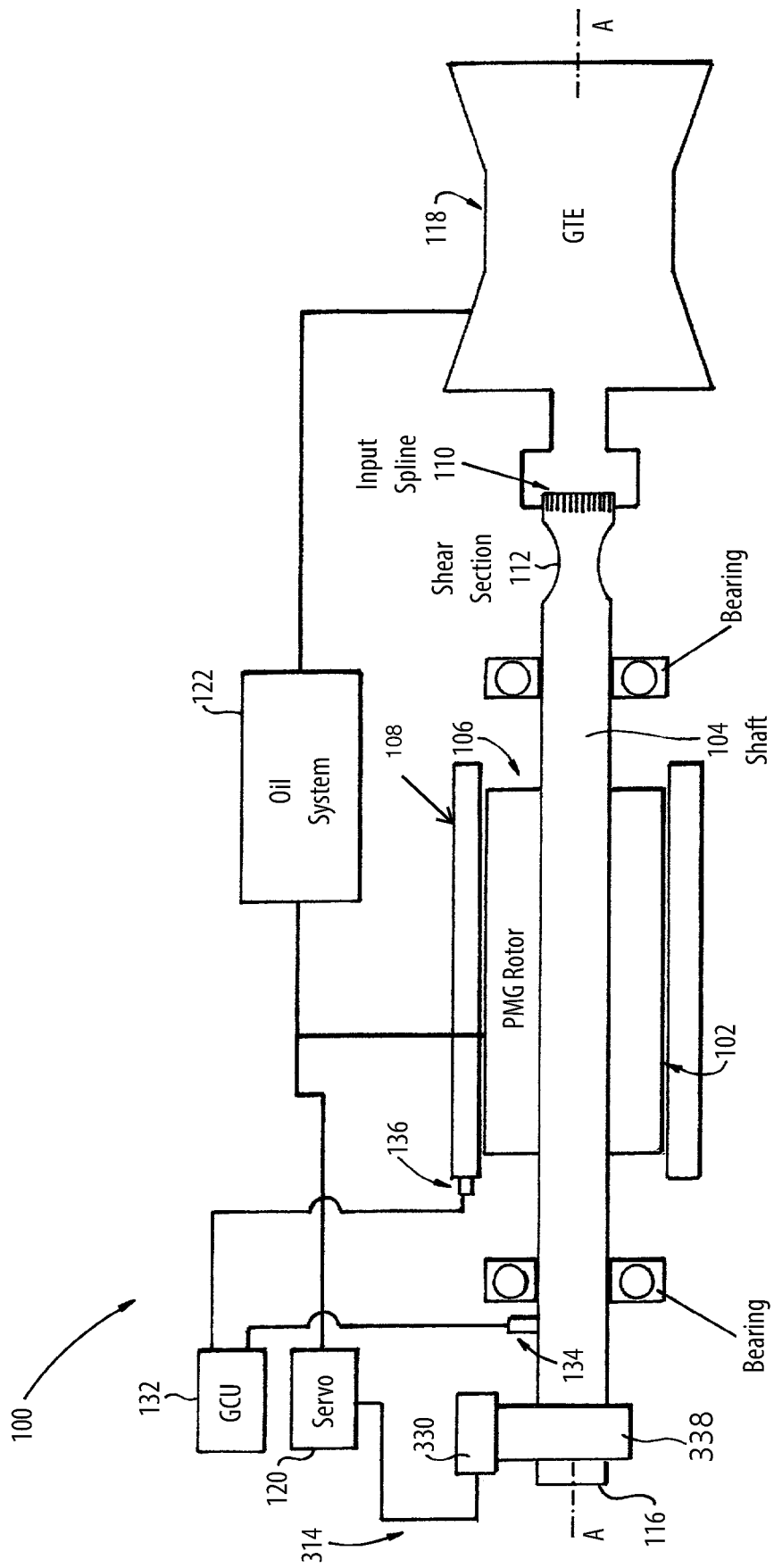
FIG. 3 is a schematic view of an embodiment of a system constructed in accordance with the present disclosure, showing a band-type brake on the generator shaft.

With reference now to FIG. 3, the system 100 is shown much as described above, but wherein the brake 314 is a band-type brake with a band 338 operatively connected, e.g. wrapped at least part way around the generator shaft 104, for applying band friction to the generator shaft 104 for braking upon actuation of the actuator 330 by the servo 120.

Systems and methods as disclosed herein can provide potential benefits including the following. Systems and methods as disclosed herein can prevents the generator and engine system from overspeeding to the point of mechanical structural failure. Systems and methods as disclosed herein can allow the braking load to be applied dynamically such that the overall generator shaft loading is decreased in a controlled manner within the control band of the engine speed control. Systems and methods as disclosed herein can prevents the generator voltage from exceeding the voltage capability of the downstream electrical components. Systems and methods as disclosed herein can place the brake on the generator shaft, allowing the mechanical load to be applied in the same load path as the electrical loads, protecting the engine/gearbox from sudden high braking loads in the case of inadvertent application of high braking forces by use of the generator input shear section 112.

The methods and systems of the present disclosure, as described above and shown in the drawings, provide for active dynamic braking for overspeed protection in permanent magnet generators (PMGs) such as those connected to gas turbine engines (GTEs) for generating power onboard aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A system comprising:
a permanent magnet generator (PMG) with a generator shaft;

an input spline on the generator shaft on a first side of the PMG with respect to a longitudinal axis of the generator shaft, a shear section of the generator shaft axially between the input spline and the PMG along the longitudinal axis and configured to be rupturable to disconnect the PMG from the input spline; and a brake operatively connected to the generator shaft axially between the input spline and an end of the generator shaft on a second side of the PMG opposite the first side with respect to the longitudinal axis.

2. The system as recited in claim 1, further comprising:
a gas turbine engine (GTE) operatively connected to the input spline to drive the PMG.

3. The system as recited in claim 2, further comprising a servo operatively connected to actuate the brake for braking rotation of the PMG, wherein the servo is a hydraulic servo connected to an oil system that is configured to provide oil to the PMG and/or to the GTE.

4. The system as recited in claim 1, wherein the brake is operatively connected to a portion of the generator shaft between the end of the generator shaft on the second side of the PMG and the PMG itself, with respect to the longitudinal axis.

5. The system as recited in claim 1, wherein the brake includes:
a disc mounted to the generator shaft; and
a caliper operatively connected to the disc and configured to selectively press the disc between pads of the caliper upon servo actuation of a piston of the caliper.

6. The system as recited in claim 1, wherein the brake is a drum type brake with pads operatively connected for servo actuation to press a drum to brake rotation of the generator shaft.

7. The system as recited in claim 1, wherein the brake is a band-type brake with a band operatively connected for servo actuation to apply band friction to the generator shaft for braking.

8. The system as recited in claim 1, further comprising a generator control unit (GCU) operatively connected to the PMG and configured to control electrical output of the PMG.

9. The system as recited in claim 8, wherein the GCU is operatively connected to a servo, which is operatively connected to actuate the brake based on commands from the GCU.

10. The system as recited in claim 9, further comprising a sensor operatively connected to the GCU and configured to provide feedback for controlling the brake.

11. The system as recited in claim 10, wherein the sensor includes a speed sensor operatively connected to provide feedback to the GCU indicative of speed of the generator shaft.

12. The system as recited in claim 10, wherein the sensor includes a voltage sensor operatively connected to a voltage output of the PMG to generate feedback to the GCU indicative of voltage that is output from the PMG.

13. The system as recited in claim 10, wherein the GCU is configured to output servo current to the servo for control of braking of the generator shaft.

14. The system as recited in claim 8, wherein the GCU includes machine readable instructions configured to cause the GCU to:
receive input indicative of an overspeed condition for the PMG and enter into a braking mode based on the input indicative of the overspeed condition; and
output a command to a servo for dynamic control of the brake for dynamically applying braking to the generator shaft.

15. The system as recited in claim 14, wherein the machine readable instructions are configured to cause the GCU to:
receive input indicative of controlled reduction below the overspeed condition for the PMG and terminate the braking mode based on the input indicative of the controlled reduction; and
output a command to the servo to end application of braking to the generator shaft.

16. The system as recited in claim 1, further comprising a mechanical governor operatively connected to actuate the brake based on speed of the generator shaft.

17. A method comprising:
receiving an input indicative of an overspeed condition for a permanent magnet generator (PMG) having a generator shaft; and
entering into a braking mode based on the input indicative of the overspeed condition;
wherein the generator shaft includes:
an input spline on a first side of the PMG with respect to a longitudinal axis of the generator shaft; and
a shear section axially between the input spline and the PMG along the longitudinal axis, the shear section configured to be rupturable to disconnect the PMG from the input spline.

18. The method of claim 17, further comprising:
outputting a command to a servo for dynamic control of a brake for dynamically applying braking to the generator shaft;
wherein the brake is operatively connected to the generator shaft axially between the input spline and an end of the generator shaft on a second side of the PMG opposite the first side with respect to the longitudinal axis.

19. The method of claim 18, further comprising:
receiving an input indicative of controlled reduction below the overspeed condition for the PMG; and
terminating the braking mode based on the input indicative of the controlled reduction.

20. The method of claim 17, wherein the shear section is configured to allow disconnection of the PMG from the input spline.

* * * * *